(12) United States Patent
Murata

(10) Patent No.: US 7,982,848 B2
(45) Date of Patent: Jul. 19, 2011

(54) VARIABLE TRANSMISSION LIGHT QUANTITY ELEMENT WITH DIELECTRIC LAYERS AND PROJECTION DISPLAY

(75) Inventor: Koichi Murata, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 11/832,730

(22) Filed: Aug. 2, 2007

(65) Prior Publication Data

US 2008/0030632 A1 Feb. 7, 2008

Related U.S. Application Data

(63) Continuation of application No. PCT/JP2006/001785, filed on Feb. 2, 2006.

(30) Foreign Application Priority Data

Feb. 2, 2005 (JP) .................................. 2005-026615

(51) Int. Cl.
G02F 1/1335 (2006.01)
G02F 1/13 (2006.01)
(52) U.S. Cl. ............................................. 349/201; 349/5
(58) Field of Classification Search ................. 349/201, 349/202
See application file for complete search history.

(56) References Cited

U.S. PATENT DOCUMENTS

| | | | |
|---|---|---|---|
| 4,850,681 A * | 7/1989 | Yamanobe et al. | 349/201 |
| 5,071,229 A * | 12/1991 | Oaki et al. | 349/200 |
| 6,088,067 A * | 7/2000 | Willett et al. | 349/5 |
| 6,778,246 B2 * | 8/2004 | Sun et al. | 349/146 |
| 2004/0046908 A1 * | 3/2004 | Shih et al. | 349/113 |
| 2007/0121210 A1 | 5/2007 | Sato | |

FOREIGN PATENT DOCUMENTS

| | | | |
|---|---|---|---|
| JP | 62-235924 A | | 10/1987 |
| JP | 4-163801 A | | 6/1992 |
| JP | 2003-185819 A | | 7/2003 |
| JP | 2003185819 A | * | 7/2003 |
| JP | 2003-241311 A | | 8/2003 |
| JP | 2004361856 A | * | 12/2004 |
| WO | WO 01/73504 A1 | | 10/2001 |

OTHER PUBLICATIONS

Palmer, Christopher, Diffraction Gratings, Feb. 1995, Spectroscopy, vol. 10, No. 2, pp. 14-15.*
U.S. Appl. No. 12/422,051, filed Apr. 10, 2009, Nashi.

* cited by examiner

*Primary Examiner* — Mark A Robinson
*Assistant Examiner* — Paul C Lee
(74) *Attorney, Agent, or Firm* — Oblon, Spivak, McClelland, Maier & Neustadt, L.L.P.

(57) ABSTRACT

A variable light transmission device and projection display apparatus which does not generate vibrations and noises but is superior in light blocking property to a variable aperture using polymer-dispersed liquid crystal and can reduce a color change of a projected image as compared with a conventional variable aperture using liquid crystal. A variable light transmission device having: a pair of transparent substrates placed in parallel to each other; a multi-layer grating member disposed on one of opposing surfaces of the pair of transparent substrates, and transparent members having a multi-layer structure periodically placed to form a diffraction grating with a convex and concave section shape; liquid crystal interposed between the transparent substrates to bury the multi-layer grating member; and transparent electrodes for applying electric field to the liquid crystal.

16 Claims, 10 Drawing Sheets

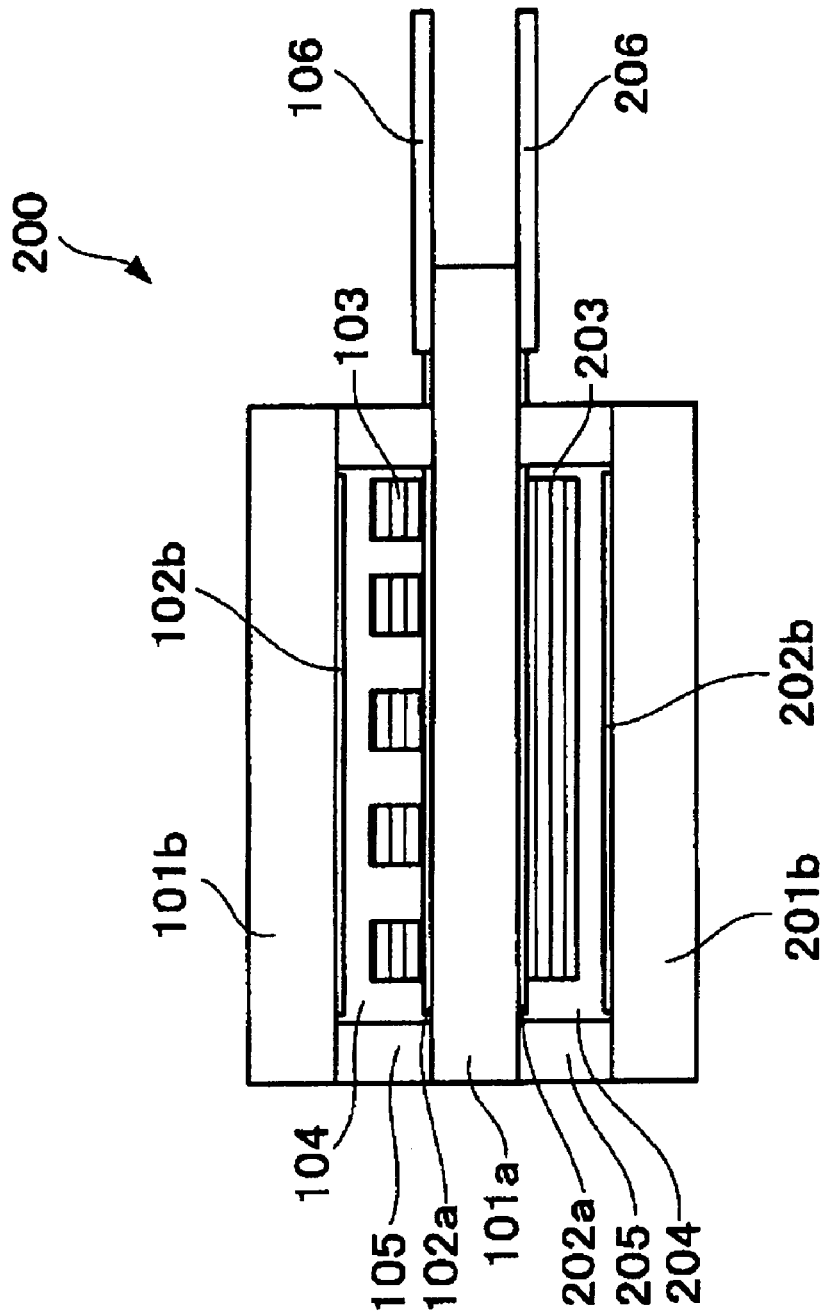

VARIABLE TRANSMISSION LIGHT QUANTITY ELEMENT WITH DIELECTRIC LAYERS AND PROJECTION DISPLAY

TECHNICAL FIELD

The present invention relates to a variable light transmission device through which incident light is transmitted while switching the quantity of the incident light, and also to a projection display apparatus.

BACKGROUND ART

As a projection display apparatus which displays a projected image, for example, known are a liquid crystal projection display apparatus (for example, see JP-A-2001-264728) in which, as shown in FIG. 8, incident light is modulated in accordance with a video signal and transmitted light is projected to display an image, and a DMD (Digital Micromirror Device, a registered trademark) type projection display apparatus (for example, see JP-A-2004-361856) in which, as shown in FIG. 9, the reflection angles of micromirrors disposed for respective pixels are changed in accordance with a video signal to modulate the quantity of reflected light, and light that is obtained as a result of the modulation is projected to display an image.

FIG. 8 is a diagram showing the basic configuration of a conventional liquid crystal projection display apparatus 80. Light emitted from a light source 1 is reflected by a reflecting mirror 2 to be formed as light which is substantially parallel to the optical axis. The parallel light enters a polarizer 4 through an illumination optical system 3, and is converted by the polarizer 4 into light of a predetermined polarization direction. The light emitted from the polarizer 4 is subjected to modulation of the polarization state by a liquid crystal panel 5 which is an image-displaying spatial light modulator, and then incident on an analyzer 6. When the light is passed through the analyzer 6, only a predetermined polarization component is emitted to a projection lens system 7, and passed through the projection lens system 7 to be projected and displayed onto a screen or the like which is not shown.

FIG. 9 is a diagram showing the basic configuration of a conventional DMD (digital micro mirror device) projection display apparatus 90. Light emitted from a light source 1 is reflected by a reflecting mirror 2 to be formed as light which is substantially parallel to the optical axis. The parallel light enters a DMD (digital micro mirror device) device 905 which is an image-displaying spatial light modulator, through an illumination optical system 3. The light which is reflected by micromirrors of the DMD (digital micro mirror device) device 905 to undergo the light quantity modulation enters a projection lens system 907, and passed through the projection lens system 907 to be projected and displayed on a screen or the like which is not shown.

It is pointed out that a projection display apparatus is lower in contrast than an image display apparatus which is not the projection type, such as a CRT. The contrast is a ratio of a luminance obtained when a white screen is displayed, and that obtained when a black screen is displayed. In a projection display apparatus, even when a black screen is displayed, stray light is incident on a projection lens, and therefore the contrast is lowered.

In the liquid crystal projection display apparatus 80, recently, a variable optical shutter or an aperture is disposed in the illumination optical system 3 or the projection lens system 7 in order to improve the contrast (for example, see JP-A-2001-264728). The disposition of a variable optical shutter or an aperture can reduce, for example, light that has a large incidence angle to the liquid crystal panel 5 which is an image-displaying spatial light modulator, or a large emission angle from the liquid crystal panel 5.

By contrast, in the DMD (digital micro mirror device) projection display apparatus 90, a black screen is displayed by swinging the micromirrors so that the light reflected from the DMD digital micro mirror device) device 905 which is an image-displaying spatial light modulator is not incident on the projection lens system 907. However, the DMD (digital micro mirror device) device 905 is an aggregation of the micromirrors, and hence scattered light is caused in peripheral portions of the micromirrors and among the micromirrors, so that part of scattered light is incident on the projection lens system 907. In the DMD (digital micro mirror device) projection display apparatus 90, the contrast can be enhanced by disposing an aperture in the projection lens system 907.

On the other hand, there is a further problem in that, when an aperture is disposed in a conventional projection display apparatus, the luminance of a white screen to be displayed is lowered. As a countermeasure against the problem, a technique is disclosed in which an aperture is configured so that the area of an opening (hereinafter, referred to as an opening amount) or the quantity of blocked light can be changed to a predetermined level (for example, see Patent Reference 2). Hereinafter, such an aperture is referred to as a variable aperture. The problem of the contrast of a projected image arises depending on the brightness of an environment where the projected image is displayed.

In a bright room which is illuminated with external light such as illumination light or sunlight, a screen is illuminated by the light regardless of whether a projected image is displayed or not. Even when a black display portion is slightly bright, therefore, there arises no problem, and a white screen is required to have luminance which can cancel the external light. By contrast, in a dark room which is not illuminated with external light, high luminance is not required, and a black screen having even a slight brightness is conspicuous. A variable aperture is adjusted so that, in an environment where external light exists, a white color is brighter, or the opening is widened so as to attain high luminance, and, in an environment where external light does not exist, the opening is narrowed so as to suppress a white color and enhance the contrast. Moreover, the opening amount is adjusted also in accordance with a projected image to be displayed.

In a conventional projection display apparatus having a variable aperture, however, the opening amount is adjusted by a mechanical system using a motor and the like, and hence there is a problem in that vibrations, noises, and the like are generated in the adjustment of the opening amount. Such vibrations, noises, and the like obstruct watching movies. There is also a variable aperture having no mechanical system, such as a variable aperture using TN liquid crystal, or that using polymer-dispersed liquid crystal. In a variable aperture using TN liquid crystal, the polarization direction of light which is incident on TN liquid crystal must be restricted to a specific polarization direction. Therefore, a polarizing plate is required. When a polarizing plate is used, however, there arises a problem in that the use efficiency of light is reduced. The reduction of the use efficiency of light is caused by the fact that the transmittance of a polarizing plate which is used for restricting the polarization direction of light that is emitted from a light source, and that is randomly polarized, to linear polarization of a specific polarization direction is 50% or less, or the fact that, even when the polarization direction is converted by using a polarization beam splitter, the polarization efficiency is about 70%. When light is to be blocked, light which has been transmitted through TN liquid crystal must be absorbed by a polarizing plate, and hence there is a problem in that the polarizing plate is heated by the light absorption, and the reliability is lowered. In a variable aperture using polymer-dispersed liquid crystal, the quantity of transmitted light is reduced by scattering incident light, and the scattering angle is small. Also when light is to be blocked, therefore, part of scattered light reaches a screen, thereby causing a problem in that light cannot be completely blocked.

DISCLOSURE OF THE INVENTION

Problems to be Solved by the Invention

The invention has been conducted in order to solve the problems, and provides a variable light transmission device and projection display apparatus in which vibrations and noises are not generated in adjustment of the quantity of blocked light, which is superior in light blocking property to a variable aperture using polymer-dispersed liquid crystal, and in which the use efficiency of light can be improved as compared with a conventional variable aperture using liquid crystal.

Means for Solving the Problems

In consideration of the above points, the invention provides following variable light transmission devices of (1) to (8) and a projection display apparatus of (9).

(1) A variable light transmission device comprising: a pair of transparent substrates which are placed in parallel to each other; a multi-layer grating member which is disposed on one of opposing substrate surfaces of the pair of transparent substrates, and in which transparent members having a multi-layer structure are periodically placed so as to form a diffraction grating, and the diffraction grating has a convex and concave section shape; a liquid crystal which is interposed between the pair of transparent substrates to bury the multi-layer grating member; and transparent electrodes for applying an electric field to the liquid crystal, wherein the transparent members possessed by the multi-layer grating member have a multi-layer structure in which plural dielectric thin films having different refractive indexes are periodically stacked.

According to the configuration, the transparent members possessed by the multi-layer grating member have a multi-layer structure in which plural dielectric thin films having different refractive indexes are periodically stacked. Therefore, the wavelength dependences of the diffraction efficiency, the transmittance, and the like can be reduced by changing wavelength dispersion of the refractive index of the multi-layer grating member. It is possible to realize a variable light transmission device in which vibrations and noises are not generated in adjustment of the quantity of blocked light, which is superior in light blocking property to a variable aperture using polymer-dispersed liquid crystal, and in which the use efficiency of light can be improved as compared with a conventional variable aperture using liquid crystal.

(2) The variable light transmission device according to (1) above, wherein the transparent electrodes comprise plural split electrodes, and a transmittance is changeable per each of areas where the split electrodes are formed.

According to the configuration, the transparent electrodes comprise plural split electrodes, and the transmittance is changeable per each of regions where the split electrodes are formed. In addition to the effects of the configuration of (1) above, therefore, it is possible to realize a variable light transmission device in which the quantity of blocked light can be finely adjusted in the opening diameter of an aperture.

(3) The variable light transmission device according to (1) or (2) above, wherein the transparent electrodes comprise plural split electrodes which are split in annular band shapes while setting an optical axis as a center, and a transmittance is changeable per each of areas where the split electrodes are formed.

(4) The variable light transmission device according to any one of (1) to (3) above, wherein the layer structure of the multi-layer grating member is configured so that, in a wavelength region from 430 nm to 630 nm, a difference between maximum and minimum values of the transmittance is 20% or less.

According to the configuration, the layer structure of the multi-layer grating member is configured so that, in a wavelength region from 430 nm to 630 nm, a difference between maximum and minimum values of the transmittance is 20% or less. In addition to the effects of the configuration of (1), (2), or (3) above, therefore, it is possible to realize a variable light transmission device in which the color balance of transmitted light is not changed even when the quantity of transmitted light is changed.

(5) The variable light transmission device according to any one of (1) to (4) above, wherein the layer structure of the multi-layer grating member is configured so that a difference between maximum and minimum values of the transmittance when light is blocked is 15% or less.

According to the configuration, the layer structure of the multi-layer grating member is configured so that a difference between maximum and minimum values of the transmittance when light is blocked is 15% or less. In addition to the effects of the configuration of any one of (1) to (4) above, therefore, it is possible to realize a variable light transmission device in which the color balance that is more problematic in the case where light is blocked can be improved as compared with a conventional variable light transmission device.

(6) The variable light transmission device according to any one of (1) to (5) above, wherein the transparent members possessed by the multi-layer grating member have a multi-layer structure in which dielectric thin films of $SiO_2$ and $Ta_2O_5$ are alternately stacked.

(7) The variable light transmission device according to any one of (1) to (6) above, wherein an extraordinary refractive index of the liquid crystal is larger than an average refractive index of the multi-layer grating member.

(8) The variable light transmission device according to any one of (1) to (7) above, wherein the variable light transmission device comprises two diffraction gratings, and placed so that orientation directions of liquid crystal molecules are perpendicular to each other.

(9) A projection display apparatus comprising: a predetermined light source; an image-displaying spatial light modulator which modulates incident light in accordance with a video signal, and which emits the modulated light; an illumination optical system which comprises plural lenses, and which converges the light emitted by the light source to convergently illuminate the image-displaying spatial light modulator; a projection lens system which projects light emitted from the image-displaying spatial light modulator; and at least one variable light transmission device according to any one of (1) to (8) above, disposed within an optical path which extends until light emitted from the light source is passed through the projection lens system.

According to the configuration, it is possible to realize a projection display apparatus comprising a variable light transmission device which has the effects of the configuration of any one of (1) to (8) above.

Effects of the Invention

The invention can provide a variable light transmission device and projection display apparatus in which, since the transparent members possessed by the multi-layer grating member have a multi-layer structure where plural dielectric thin films having different refractive indexes are periodically stacked, the wavelength dependences of the diffraction efficiency, the transmittance, and the like can be reduced by changing wavelength dispersion of the refractive index of the multi-layer grating member, and vibrations and noises are not generated in adjustment of the quantity of blocked light, which is superior in light blocking property to a variable aperture using polymer-dispersed liquid crystal, and in which the use efficiency of light can be improved as compared with a conventional variable aperture using liquid crystal.

BRIEF DESCRIPTION OF THE DRAWINGS

FIG. 4 is a view showing the block configuration of a variable light transmission device (regardless of the polarization state) of an embodiment of the invention.

Figure 1:
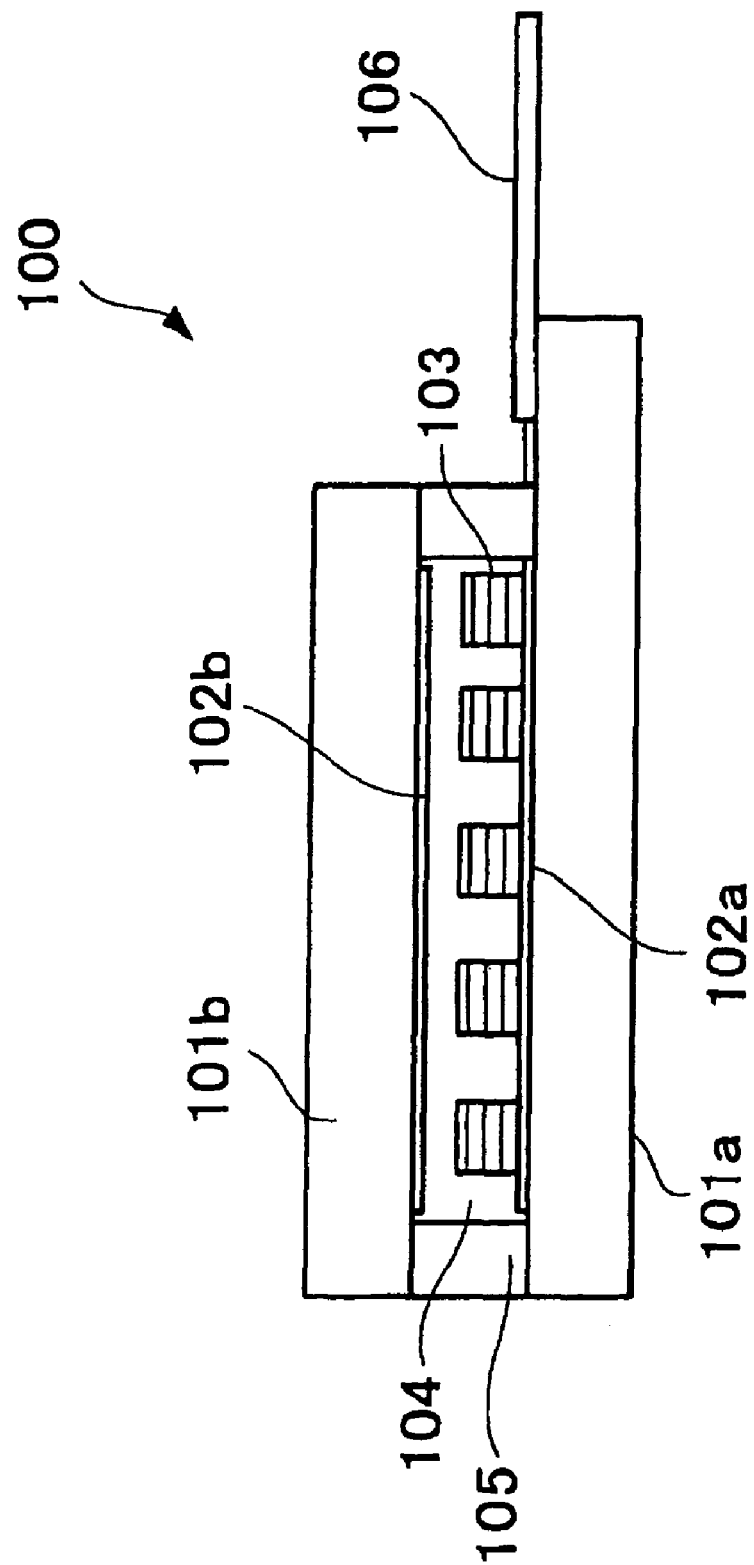
FIG. 1 is a view showing the block configuration of a variable light transmission device (for linear polarization) of an embodiment of the invention.

DESCRIPTION OF REFERENCE NUMERALS AND SIGNS 1 light source
2 reflecting mirror
3 illumination optical system
4 polarizer
5 liquid crystal panel
6 analyzer
7, 907 projection lens system
8 light source power supply
9 movable-aperture driving portion
50, 60, 80 liquid crystal projection display apparatus
90 DMD (digital micro mirror device) projection display apparatus
100, 200 variable light transmission device
101a, 101b, 201b transparent substrate
102a, 102b, 202a, 202b transparent electrode
103, 203 multi-layer grating member
104, 204 liquid crystal
105, 205 seal
106, 206 wiring
111, 112, 113, 121, 122, 123 split electrode
905 DMD (digital micro mirror device) device

BEST MODE FOR CARRYING OUT THE INVENTION

Hereinafter, embodiments of the invention will be described with reference to the drawings.

Embodiments

FIG. 1 is a sectional view showing a schematic configuration of a variable light transmission device of an embodiment of the invention. Referring to FIG. 1, the variable light transmission device 100 comprises: a pair of transparent substrates 101a, 101b which are placed in parallel to each other; a multi-layer grating member 103 which is disposed on a substrate surface of the transparent substrate 101a, and in which transparent members having a multi-layer structure are periodically placed so as to form a diffraction grating; a liquid crystal 104 which is interposed between the pair of transparent substrates 101a, 101b on which the multi-layer grating member 103 is disposed, so as to bury the multi-layer grating member 103; transparent electrodes 102a, 102b for applying an electric field to the liquid crystal 104; a seal 105; and wirings 106 for applying a voltage of a predetermined waveform between the transparent electrodes 102a, 102b.

Referring to FIG. 1, as the transparent substrates 101a, 101b, for example, an acrylic resin, an epoxy resin, a vinyl chloride resin, a polycarbonate, or the like may be used. From the viewpoint of durability or the like, it is preferable to use a glass substrate. It is preferable to apply a predetermined orienting process in which, for example, an orientation film of polyimide, PVA, or the like is formed and rubbed, on the interfaces between the transparent substrates 101a, 101b and the liquid crystal 104, because the controllability of orientation of the liquid crystal can be improved. As an orientation film made of an inorganic material, for example, a thin film which is obtained by performing oblique deposition of SiON, or a film in which an orienting process is performed by ion beam irradiation can be used. An orienting process based on oblique deposition or ion beam irradiation is preferable because excellent improvement is obtained in the orientation force of recesses of the convex and concave grating member on which an orienting process due to rubbing is hardly performed.

As shown in FIG. 1, each of the transparent members constituting the multi-layer grating member 103 has a multi-layer structure in which plural dielectric thin films having different refractive indexes are periodically stacked (hereinafter, a film having such a layered structure is referred to merely as a multi-layer film). The reason of this configuration is as follows. The use of the multi-layer grating member 103 having the above-described layered structure allows the interference state of light in the multi-layer film to be changed in each wavelength. The wavelength dispersion of the refractive index of the multi-layer grating member 103 can be effectively controlled to be set to a desired one. Also the wavelength dependences of the diffraction efficiency and the zero order transmittance can be controlled. The zero order transmittance means the transmittance of light which is transmitted through the variable light transmission device 100 without being diffracted.

The multi-layer grating member 103 is obtained by periodically depositing plural dielectric thin films having different refractive indexes in the thickness direction by using, for example, the vacuum deposition method or the sputtering method, and then processing the films into a diffraction grating-like structure having convexes by using the photolithography technique and the etching technique. As a material of the dielectric thin films, an oxide of Si, Ta, Nb, Ti, Al, Mg, Ca, or the like is preferably used in the viewpoint of reliability. Alternatively, a nitride, a fluoride, or the like may be used. In the case where two kinds of dielectric thin films are combinedly used, a combination of $SiO_2$ and $Ta_2O_5$ is preferable because the refractive index difference is large and the design is easy, and in the viewpoints of reliability, transmittance in the short wavelength region, light resistance, controllability of production, and the like.

Table 1 is a table illustrating the layer structure of the multi-layer grating member 103.

TABLE 1

| Layer | Refractive index | Film thickness (μm) |
|---|---|---|
| L1 | 1.41 | 0.2126 |
| L2 | 2.22 | 0.0317 |
| L3 | 1.41 | 0.2126 |
| L4 | 2.22 | 0.0317 |
| L5 | 1.41 | 0.2126 |
| L6 | 2.22 | 0.0317 |
| L7 | 1.41 | 0.2126 |
| L8 | 2.22 | 0.0317 |
| L9 | 1.41 | 0.2126 |
| L10 | 2.22 | 0.0317 |
| L11 | 1.41 | 0.2126 |
| L12 | 2.22 | 0.0317 |
| L13 | 1.41 | 0.2126 |
| Substrate | 1.52 | |
| Total film thickness | | 1.6799 |

Table 1 shows an example of the layer structure of the multi-layer grating member 103 in which two kinds of dielectric thin films (for example, L1, L2) are alternately stacked in thirteen layers in total to form a total film thickness of 1.6779 μm. The dielectric thin films which are typified by the layer L1 (hereinafter, referred to as L1 dielectric thin films) are configured by films having a refractive index of 1.41 and a thickness of 0.2126 μm, and the dielectric thin films which are typified by the layer L2 (hereinafter, referred to as L2 dielectric thin films) are configured by films having a refractive index of 2.22 and a thickness of 0.0317 μm. The transparent substrates 101a, 101b have a refractive index of 1.52.

Usually, the diffraction efficiency of a diffraction grating is changed depending on a ratio of the difference of optical path lengths (=refractive index×distance) of light transmitted through concave and convex portions of a convex and concave grating, and the wavelength. Hereinafter, a method of reducing the wavelength dependence of the diffraction efficiency will be described in detail. In order to reduce the wavelength dependences of the diffraction efficiency, it is necessary to approximate the value of optical path length difference/wavelength to a constant in a used wavelength band. Namely, it is required that the optical path length difference in a short wavelength side is decreased, and that in a long wavelength side is increased. In order to approximate the wavelength dependence of the optical path length difference to a desired value, preferably, the convex and concave grating is configured by the multi-layer grating member 103.

In the example of the multi-layer film shown in FIG. 1, specifically, a multi-layer film is formed so that light is reflected in the vicinities of wavelengths of 370 nm and 740 nm across a wavelength band in which the light quantity is to be variable (the used wavelength band, in the example, visible light from 430 nm to 630 nm), and the transmittance is high (reflection is reduced) in the wavelength band in which the light quantity is to be variable. In the case where a multi-layer film has a wavelength band in which light is reflected (reflection band) as described above, the effective refractive index in the short wavelength side of the reflection band is made small (the optical path length is short) by interference of light in the multi-layer film, and in contrast that in the long wavelength side is made large (the optical path length is long). In the example, the reflection bands are disposed in both sides of the used wavelength band. Therefore, the effective refractive index in the short wavelength side (=the long wavelength side of the reflection band of 370 nm) of the used wavelength band is made high, and in contrast that in the long wavelength side (=the short wavelength side of the reflection band of 740 nm) is made small.

The multi-layer film is processed into a diffraction grating-like structure to be formed as the multi-layer grating member so that the convex portions are configured as a multi-layer film and liquid crystal is filled in the concave portions. When the refractive index of the liquid crystal occupying the concave portions is higher than that of the multi-layer grating member of the convex portions, the effective refractive index between the multi-layer grating member and the liquid crystal is small in the short wavelength side, and large in the long wavelength side. At this time, the optical path length difference between light transmitted through the multi-layer grating member of the convex portions and that transmitted through the liquid crystal of the concave portions is small in the short wavelength side, and large in the long wavelength side. Therefore, the ratio of the optical path length difference and the wavelength can be approximated to a constant, and the wavelength dependences of the diffraction efficiency and the transmittance can be reduced.

In the above, the case where the reflection bands are disposed in both sides of the used wavelength band so as to sandwich the band has been described. Alternatively, the reflection band may exist in one of the short and long wavelength sides of the used wavelength band. Also in the alternative, because of the same reason as described above, the wavelength dependences of the diffraction efficiency, the transmittance, and the like in the used wavelength band can be reduced. It is assumed that the short wavelength side of the reflection band means one of wavelength bands in a wavelength range which extends from the short wavelength end of the used wavelength band to the wavelength that is shorter by 200 nm. It is assumed that the long wavelength side of the reflection band means one of wavelength bands in a wavelength range which extends from the long wavelength end of the used wavelength band to the wavelength that is longer by 400 nm. In the above-described wavelength bands, the reflection band is not excessively separated from the used wavelength band, and the interference effect of light can be effectively used.

As a result, the change of the effective refractive index can be made small, and the wavelength dependence of the transmittance can be set to a desired one, which are preferable.

It is preferable to render the reflectivity of the reflection band being 50% or more, because the interference effect of light can be effectively used, and because the wavelength dependence of the transmittance can be set to a desired one in the same manner as described above. It is preferable to render the extraordinary refractive index of the liquid crystal larger than the average refractive index (sum of products of the refractive indexes of the layers and the thicknesses/sum of the thicknesses of the layers) of the multi-layer film, because the value of optical path length difference/wavelength of light transmitted through the diffraction grating can be approximated to a constant, and because the wavelength dependence of the diffraction efficiency can be reduced. It is preferable to render the ordinary refractive index of the liquid crystal approximately equal to the average refractive index of the multi-layer film, because the optical path length difference of light transmitted through the diffraction grating is reduced, and because the transmittance can be made high.

The multi-layer grating member 103 is configured so that, when light is to be blocked (the diffraction efficiency is high), the optical path length difference between light transmitted through the liquid crystal 104 and that transmitted through the multi-layer grating member 103 is different by about a half wavelength. When light is to be transmitted (the diffraction efficiency is low), a state where the above-described optical path length difference is approximately equal or different by an integer multiple of the wavelength is obtained. The application of the invention is not restricted to the example of the multi-layer film shown in Table 1. Any configuration may be employed in which, when light is to be blocked (the diffraction efficiency is high), the optical path length difference between light transmitted through the liquid crystal 104 and that transmitted through the multi-layer grating member 103 is different by about a half wavelength, and, when light is to be transmitted (the diffraction efficiency is low), a state where the above-described optical path length difference is approximately equal or different by an integer multiple of the wavelength is obtained.

The design of the multi-layer film may be changed in accordance with a desired spectroscopic characteristic of the transmittance and the property of the liquid crystal. In the above, for the sake of simplicity of description, description has been made by using the model in which the refractive indexes of the materials of the dielectric thin films, the liquid crystal, and the like do not have a wavelength dependence. However, the above-mentioned dielectric materials such as $SiO_2$ and $Ta_2O_5$, and the liquid crystal have a wavelength dependence of the refractive index. In this case, the refractive index of the variable light transmission device 100 is designed in consideration of these wavelength dependences, whereby the same effects can be attained.

The liquid crystal 104 has the birefringence, and the positive or negative dielectric anisotropy. Hereinafter, for the sake of convenience in description, liquid crystal having the positive dielectric anisotropy (when a voltage is applied, the longitudinal directions of liquid crystal molecules are oriented in the direction of the electric field) is used as the liquid crystal 104. The ordinary refractive index of the liquid crystal 104 is indicated by $n_o$, and the extraordinary refractive index is indicated by $n_e$.

The configuration where one of the ordinary refractive index $n_o$ and the extraordinary refractive index $n_e$ is set so that the optical path length difference between light passed through the liquid crystal 104 and that passed through the multi-layer grating member 103 is not produced, and the other refractive index is set so that the optical path length difference is about a half wavelength is preferable because transmission or diffraction of light can be obtained without applying a voltage. Hereinafter, it is assumed that liquid crystal molecules are oriented in the longitudinal direction of the multi-layer grating member 103 in a state where a voltage is not applied, the ordinary refractive index $n_o$ is set so that the optical path length difference between light passed through the liquid crystal 104 and that passed through the multi-layer grating member 103 is not produced, and the extraordinary refractive index $n_e$ is set so that the optical path length difference between light passed through the liquid crystal 104 and that passed through the multi-layer grating member 103 is a half wavelength.

As the transparent electrodes 102a, 102b, thin films of a metal oxide such as ITO or $SnO_2$, metal thin films, or the like may be used. From the viewpoint of transmittance, thin films of a metal oxide such as ITO or $SnO_2$ are preferable. The transparent electrode 102a may be formed so that it is contacted onto the substrate surface of the transparent substrate 101a as shown in FIG. 1, or may be formed so that it is formed over the transparent substrate 101a on which the multi-layer grating member 103 is formed. From the viewpoint that the wirings are prevented from being broken, it is preferable that the electrode is formed so as to be contacted onto the substrate surface.

FIG. 2 is a view illustrating a configuration example in which the transparent electrodes 102a, 102b are split into plural split electrodes 111, 112, 113. Hereinafter, for the sake of convenience in description, it is assumed that light is transmitted through the portions of the split electrodes 111, 112, 113 which are indicated as white in the drawing, and partly diffracted in the meshed portions of the split electrodes 111, 112, 113 in accordance with an applied voltage.

Figure 2A:
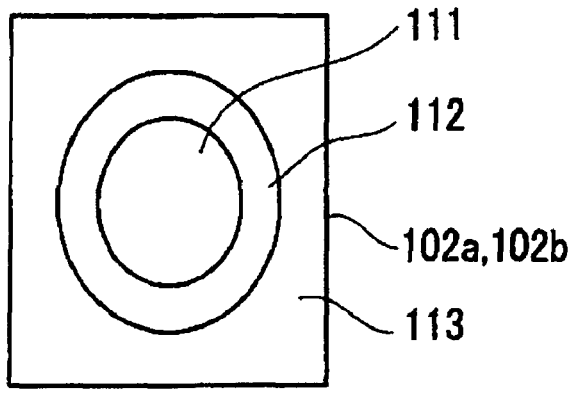
FIG. 2 is a diagram showing an example (substantially circular) of split electrodes constituting a transparent electrode in the embodiment of the invention.
Figure 2B:
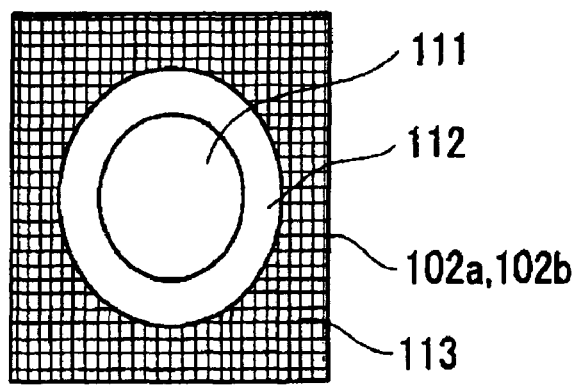
Figure 2C:
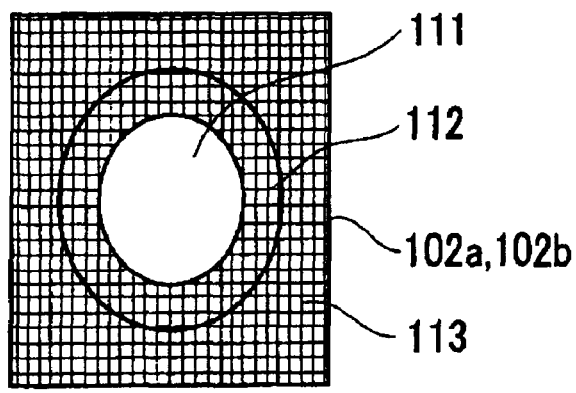

FIG. 2(a) shows a manner in which all the split electrodes 111, 112, 113 are set to the same potential, and light is transmitted through the whole areas where the split electrodes 111, 112, 113 are disposed. Similarly, FIG. 2(b) shows a manner in which the potential of the split electrode 113 is switched, and light is diffracted in the area where the split electrode 113 is disposed. FIG. 2(c) shows a manner in which the potential of the split electrode 112 is further switched, and light is diffracted also in the area where the split electrode 112 is disposed.

According to the configuration, the zero order transmittance of light can be changed in each of the areas where the split electrodes 111, 112, 113 are disposed, and therefore it is possible to block light which is incident on an optical device of a subsequent stage.

Figure 3A:
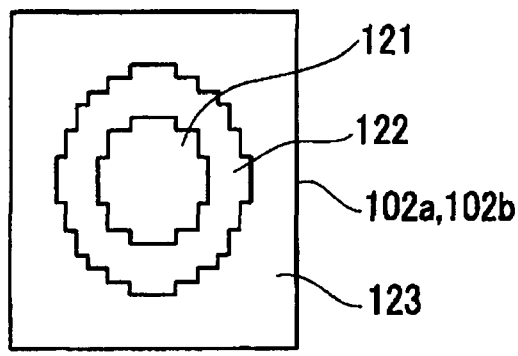
FIG. 3 is a diagram showing another example (for a microlens) of the split electrodes constituting the transparent electrode in the embodiment of the invention.
Figure 3B:
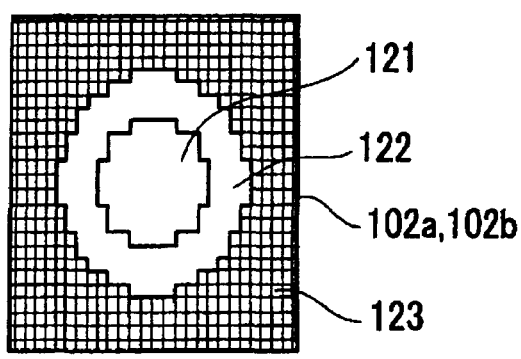
Figure 3C:
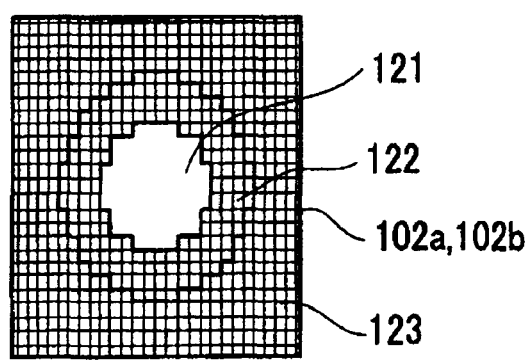

FIG. 3 is a view showing the configuration of transparent electrodes 102a, 102b which are configured by plural split electrodes 121, 122, 123 in the same manner as the transparent electrodes 102a, 102b shown in FIG. 2. The split electrodes 121, 122, 123 shown in FIG. 3 have a shape which is preferably used in the case where the illumination optical system constituting a projection display apparatus includes a microlens (fly array lens). In the shapes of the split electrodes 121, 122, 123 shown in FIG. 3, namely, end portions of the split electrodes 121, 122, 123 are similar to the shapes of cells of the microlens, and light which is passed through the cells is caused to be preferably transmitted or diffracted.

The seal 105 is disposed in order to hermetically seal the liquid crystal 104 between the pair of transparent substrates 101a, 101b. As the seal 105, a resin made of a thermoset polymer, such as an epoxy rein, an ultraviolet curable resin, or the like may be used. Alternatively, as the seal 105, a material in which spacers of glass fiber or the like are mixed at several % may be used in order to obtain a desired cell distance.

The wirings 106 are used for applying a voltage of a predetermined waveform between the transparent electrodes 102a, 102b. As the wirings, flexible wirings or the like may be used.

Hereinafter, the function of the variable light transmission device 100 will be described. When the voltage is applied to the liquid crystal 104, the refractive index is effectively changed, and the effective refractive indexes of the multi-layer film constituting the multi-layer grating member 103 and the liquid crystal 104 are made substantially equal to each other. As a result, there is no optical path length difference between light transmitted through the transparent members constituting the multi-layer grating member 103, and that transmitted through the liquid crystal portion between the transparent members (hereinafter, the portion is referred to as grating concave portion). Therefore, light is transmitted through the device without being diffracted, so that a high transmittance can be obtained. By contrast, when the effective refractive indexes of the multi-layer film constituting the multi-layer grating member 103 and the liquid crystal 104 are not equal to each other, an optical path length difference is produced between light transmitted through the transparent members, and that transmitted through the grating concave portion (only liquid crystal), and hence diffraction occurs and the zero order transmittance is reduced. When the optical path length difference becomes about one half of the wavelength, the diffraction efficiency is maximum, and the zero order transmittance is approximately 0, so that a light blocking state is attained.

Hereinafter, in order to simplify the description, it is assumed that light which is incident on the variable light transmission device 100 is linearly polarized in the longitudinal directions of liquid crystal molecules, i.e., the longitudinal direction of the multi-layer grating member 103, and, when the applied voltage V is "0", liquid crystal molecules are substantially parallel to the substrates 101a, 101b. Further, it is assumed that, when the applied voltage has a sufficiently large value Vo, liquid crystal molecules are substantially perpendicular to the substrates 101a, 101b. When the above-described voltage (V=Vo) is applied, liquid crystal molecules are perpendicular to the substrates 101a, 101b, and hence the effective refractive index with respect to the incident light is $n_o$. When no voltage is applied (V=0), the effective refractive index of the liquid crystal is $n_e$. Therefore, the effective refractive index of the liquid crystal 104 can be changed by applying a voltage.

When the effective refractive index of the multi-layer grating member 103 and the ordinary refractive index $n_o$ of the liquid crystal 104 are made substantially equal to each other, the effective refractive indexes of the multi-layer grating member 103 and the liquid crystal 104 are made substantially equal to each other by applying a voltage to the liquid crystal 104, and it is possible to obtain a high zero order transmittance. By contrast, when the voltage is gradually lowered and liquid crystal molecules become near horizontal, the effective refractive index of the liquid crystal 104 is reduced, and an optical path length difference is produced between light transmitted through the transparent members, and that transmitted through the grating concave portion (only liquid crystal), and hence diffraction occurs and the zero order transmittance is reduced. When the optical path length difference becomes about one half of the wavelength, the diffraction efficiency is maximum, and the zero order transmittance is approximately 0, so that a light blocking state is attained.

Figure 7:
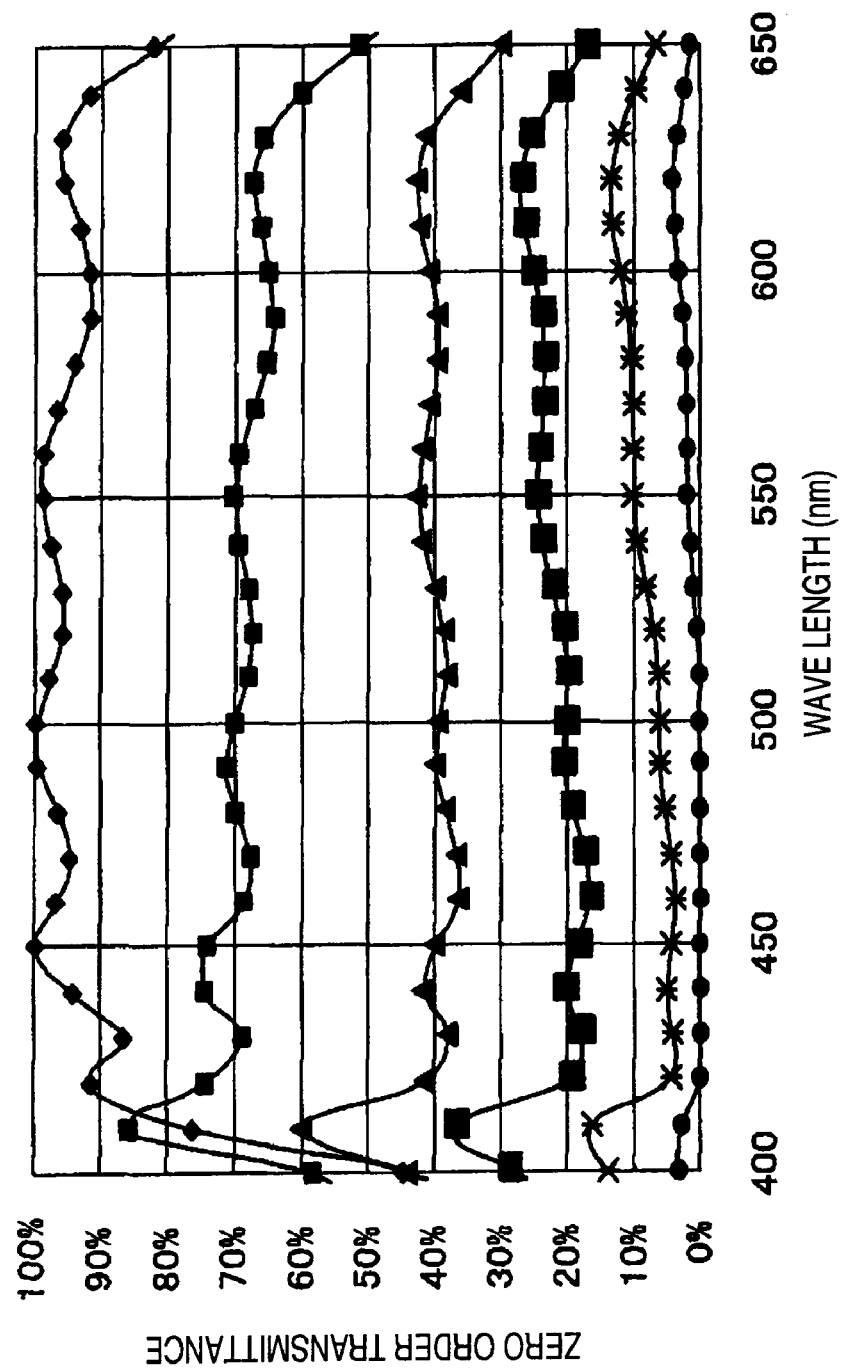
FIG. 7 is a view showing the wavelength dependence of the zero order transmittance in the case where light of a polarization direction which is parallel to the longitudinal direction of a diffraction grating is incident on a variable light transmission device 100 of an embodiment of the invention.
Figure 8:
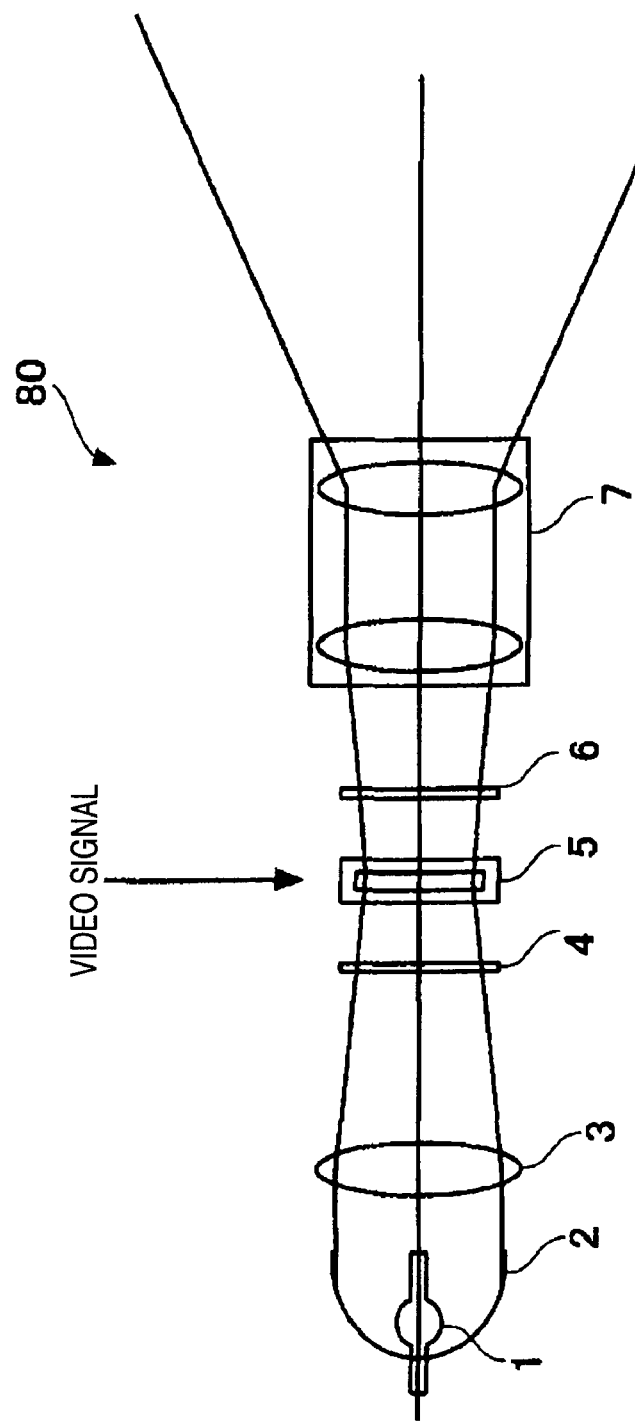
FIG. 8 is a diagram showing the basic configuration of a conventional liquid crystal projection display apparatus 80.
Figure 9:
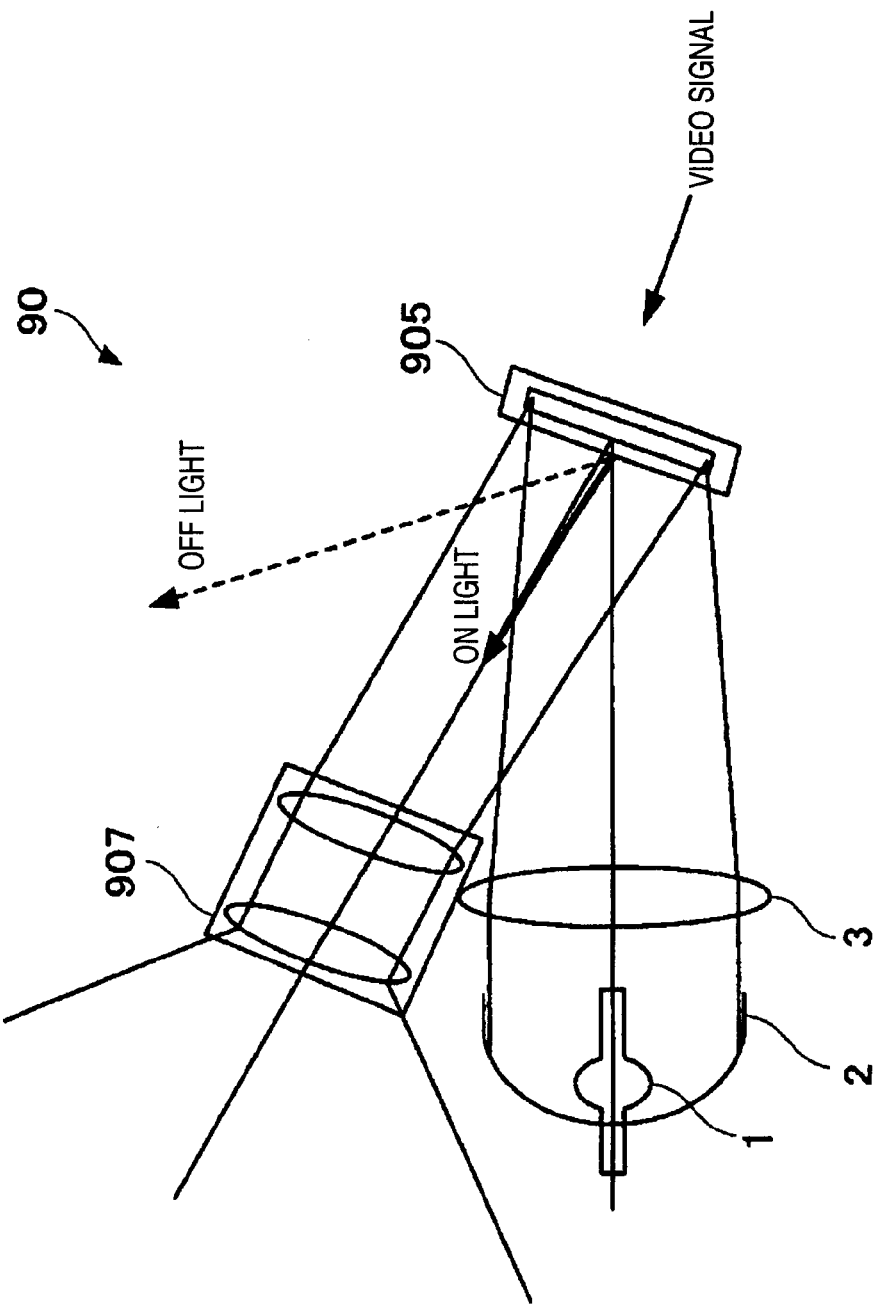
FIG. 9 is a diagram showing the basic configuration of a conventional DMD (digital micro mirror device) projection display apparatus 90.

Hereinafter, an example in which the multi-layer film is configured as shown in Table 1 will be described. FIG. 7 shows the wavelength dependence of the zero order transmittance in the case where the effective refractive index of the liquid crystal 104 is changed. The curves in FIG. 7 show the wavelength dependences of the zero order transmittance in the case where the effective refractive index of the liquid crystal 104 is 1.52, 1.57, 1.60, 1.62, 1.64, and 1.66, in descending order of the transmittance at the wavelength of 500 nm. Assuming that the ordinary refractive index $n_o$ of the liquid crystal 104 is 1.52 and the extraordinary refractive index $n_e$ is 1.66, when the applied voltage is a sufficiently high voltage (Vo), the effective refractive index of the liquid crystal 104 is $n_o$. Therefore, the transmittance is high. When the voltage is "0", the effective refractive index of the liquid crystal 104 is $n_e$. Therefore, light is diffracted, and the light blocking state where the zero order transmittance is small is attained.

In the above, the description has been made with taking the configuration where, when the applied voltage V is "0", the longitudinal directions of liquid crystal molecules are parallel to the substrate, as an example. It is preferable to use a liquid crystal which has a negative dielectric anisotropy (As) such that, when the applied voltage V is "0", the longitudinal directions of liquid crystal molecules are substantially perpendicular to the substrate, and, when the applied voltage is sufficiently high, liquid crystal molecules are parallel to the substrate, because it is possible to realize a high transmittance state with the applied voltage V of "0", and to maintain the high transmittance even when the voltage cannot be applied for any reason, thereby preventing light from being blocked when a fault occurs.

Figure 10:
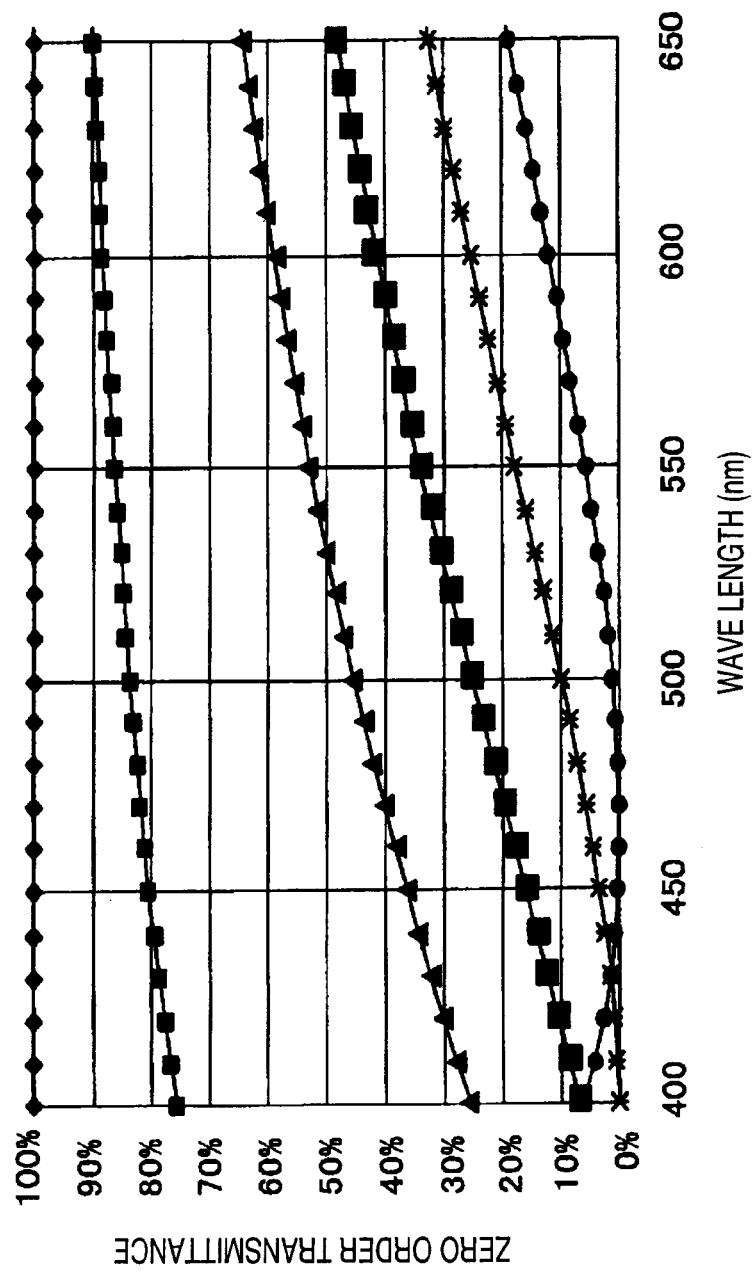
FIG. 10 is a view showing the wavelength dependence of the zero order transmittance in the case where light of a polarization direction which is parallel to the longitudinal direction of a diffraction grating is incident on a conventional variable light transmission device.

By contrast, when the diffraction grating is formed by a single film in place of the multi-layer film, as shown as a comparative example in FIG. 10, the wavelength dependence of the zero order transmittance prominently appears in a region where the quantity of blocked light is large, i.e., a region where the zero order transmittance is small, and the color temperature is largely changed. This is not preferable. As described above, when the diffraction grating is formed by a single film, the wavelength dependence of the zero order transmittance is very large, and, when it is formed by a multi-layer film, the wavelength dependence of the zero order transmittance can be reduced. This is preferable in the viewpoint of color balance.

The reason of the above is as follows. Interference of light due to the multi-layer film causes the effective refractive index to be provided with the wavelength dependence so that the refractive index in the short wavelength side with respect to visible light becomes high. With using such a wavelength dependence, the wavelength dependence of the phase of light can be reduced in an end face of the multi-layer grating member 103 on the side of the transparent substrate 101b.

Hereinafter, the function of the variable light transmission device 100 in the case where the transparent electrodes 102a, 102b are configured by the plural split electrodes 111, 112, 113 shown in FIG. 2 will be described. It is assumed that light incident on the variable light transmission device 100 is linearly polarized in the longitudinal direction of the diffraction grating. First, light incident on the variable light transmission device 100 is passed through the multi-layer grating member 103 and the liquid crystal 104. At this time, light passed through the liquid crystal 104 has different phases in accordance with voltages applied between the split electrodes 111, 112, 113.

In the case of FIG. 2(b), for example, in a split electrode(s) in which the applied voltage is "0" (hereinafter, it is assumed that such electrodes are the split electrodes 111, 112), there is no optical path length difference between light passed through the liquid crystal 104 and that passed through the multi-layer grating member 103. Therefore, light which is incident on the areas where the split electrodes 111, 112 of the variable light transmission device 100 are disposed is transmitted.

By contrast, in an area(s) of a split electrode(s) on which the voltage V that causes the optical path length difference between light passed through the liquid crystal 104 and that passed through the multi-layer grating member 103 to be about a half wavelength is applied (hereinafter, it is assumed that such an electrode is the split electrode 113), the optical path length difference between light passed through the liquid crystal 104 and that passed through the multi-layer grating member 103 is about a half wavelength. Therefore, light which is incident on the area where the split electrode 113 of the variable light transmission device 100 is disposed is diffracted, and the zero order transmitted light is reduced. In this case, the variable light transmission device 100 functions as a diffraction grating which has a small wavelength dependence, and hence the wavelength dependence of the zero order transmitted light can be reduced.

It is desirable that the concave and convex portions due to the multi-layer grating member 103, and the electrodes are not formed in a part of the variable light transmission device 100. When the concave and convex portions due to the multi-layer grating member 103 and the split electrode 111 in the center portion of the variable light transmission device 100 such as the area where the split electrode 111 is formed in FIG. 2 are not formed, for example, diffraction due to the multi-layer grating member 103 does not occur, the area where the split electrode 111 is formed can be always set to the transmit state, the transmittance is high, and even a small diffraction loss is not produced. Therefore, this is preferable. When an electrode is not formed in an area where the light blocking state is to be always attained, a high diffraction efficiency is always obtained, and the light blocking state can be attained.

In the above, the variable light transmission device 100 which can change the quantity of blocked light of linear polarization has been described. In an apparatus which modulates and projects light that is randomly polarized (hereinafter, referred to as random polarization), such as a DMD (digital micro mirror device) projection display apparatus, when the above-described configuration is applied as it is, it is not possible to change the quantity of blocked light of a polarization direction perpendicular to the above-mentioned polarization direction. The reason of this is as follows. While a liquid crystal panel can modulate only light of a specific polarization direction, a DMD (digital micro mirror device) device can modulate also light of random polarization.

In this case, a variable light transmission device which functions on two perpendicular polarization directions is used. Namely, two above-described variable light transmission devices 100 are placed so that the orientation directions of liquid crystal molecules are perpendicular to each other (the devices are combinedly placed so that the longitudinal directions of the diffraction gratings are perpendicular), whereby the quantity of blocked light can be effectively changed with respect to light of random polarization. In order to cause the orientation directions of liquid crystal molecules to be perpendicular to each other, the longitudinal directions of the diffraction gratings are made perpendicular to each other in this way. As described above, the quantity of blocked light may be changed by using two identical variable light transmission devices 100. Alternatively, as shown in FIG. 4, it is preferable to use a variable light transmission device 200 in which variable light transmission devices 100 are superimposed on each other so that the longitudinal directions of diffraction gratings of the variable light transmission devices 100 are perpendicular to each other (the transparent substrate 101a is commonly used). When the variable light transmission device 200 is used, the space and the cost can be reduced.

Figure 5:
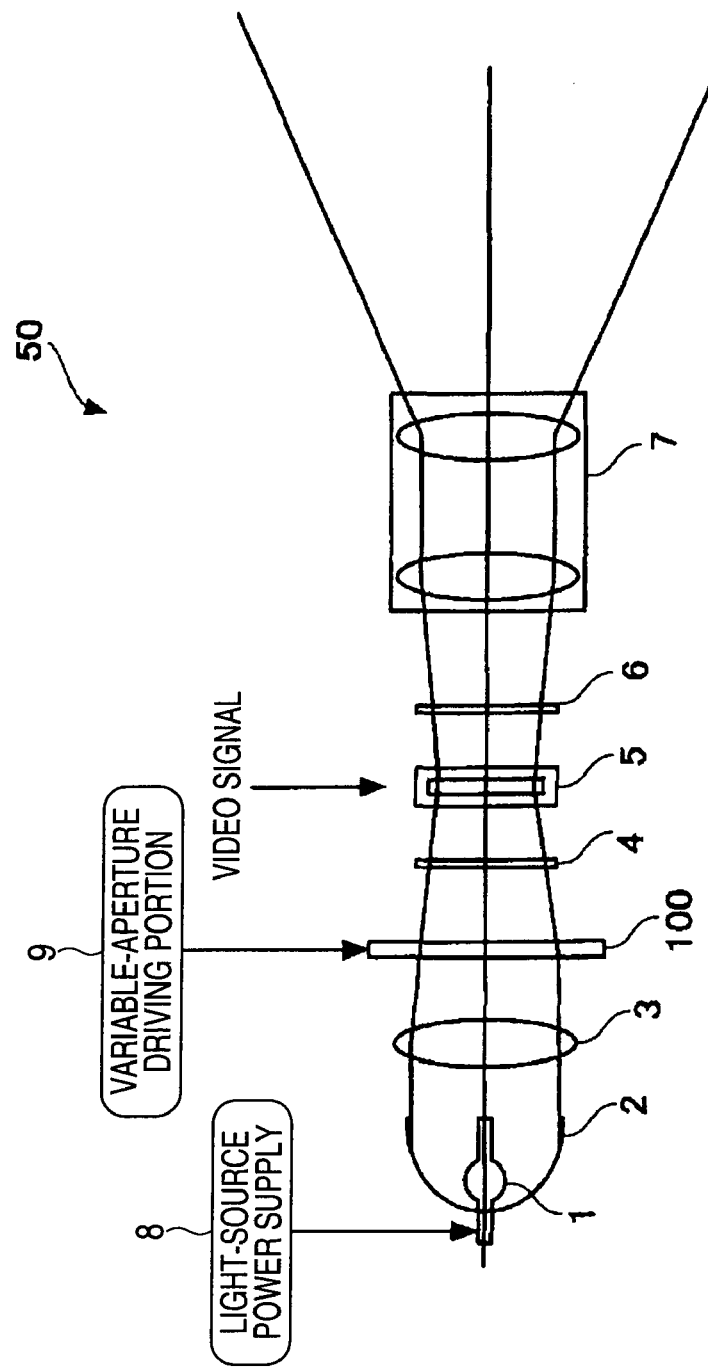
FIG. 5 is a diagram showing an example of the configuration of a liquid crystal projection display apparatus of an embodiment of the invention.

FIG. 5 is a diagram showing an example of the configuration of a liquid crystal projection display apparatus of an embodiment of the invention. Referring to FIG. 5, the liquid crystal projection display apparatus 50 is configured so as to include: a light source 1; a light source power supply 8 which supplies a power to the light source 1; a reflecting mirror 2 which reflects light emitted from the light source 1; a liquid crystal panel 5 which is an image-displaying spatial light modulator for modulating incident light according to a video signal, and emitting the modulated light; an illumination optical system 3 which comprises plural lenses, and which converges the light emitted by the light source to illuminate the image-displaying spatial light modulator; a variable light transmission device 100 which adjusts the quantity of blocked light to change the quantity of light incident on the liquid crystal panel 5; a movable-aperture driving portion 9 which drives the variable light transmission device 100; a polarizer 4 which emits light of linear polarization in incident light; an analyzer 6 which emits light of linear polarization in light emitted from the liquid crystal panel 5; and a projection lens system 7 which projects light emitted from the analyzer 6, onto a screen that is not shown.

Here, it is assumed that the longitudinal direction of liquid crystal molecules which are oriented in the longitudinal direction of the diffraction grating of the variable light transmission device 100 is substantially coincident with the transmission polarization direction of the polarizer 4.

Hereinafter, the function the liquid crystal projection display apparatus 50 will be described. First, light emitted from the light source 1 is reflected by the reflecting mirror 2 to be formed as light which is substantially parallel to the optical axis, and then converted by the illumination optical system 3 into light which is to convergently illuminate the liquid crystal panel 5. Light emitted from the illumination optical system 3 is transmitted through the variable light transmission device 100 in which the quantity of blocked light is set by the movable-aperture driving portion 9, whereby the quantity of light of linear polarization which is polarized in the transmission polarization direction of the polarizer 4 (hereinafter, such polarization is referred to as S polarization) is adjusted. At this time, the diffraction angle can be adequately set by adjusting the grating pitch so that light diffracted by the variable light transmission device 100 does not reach the screen. Preferably, an aperture for blocking the diffracted light, or the like may be used.

The light emitted from the variable light transmission device 100 is passed through the polarizer 4, whereby only light of S polarization is emitted toward the liquid crystal panel 5. As a result, only light of S polarization in which the light quantity is adjusted by the variable light transmission device 100 is emitted toward the liquid crystal panel 5. The light incident on the liquid crystal panel 5 is subjected to modulation in accordance with a video signal, emitted to the analyzer 6 and the projection lens system 7, and is passed through the projection lens system 7 to be projected and displayed onto the screen which is not shown.

Figure 6:
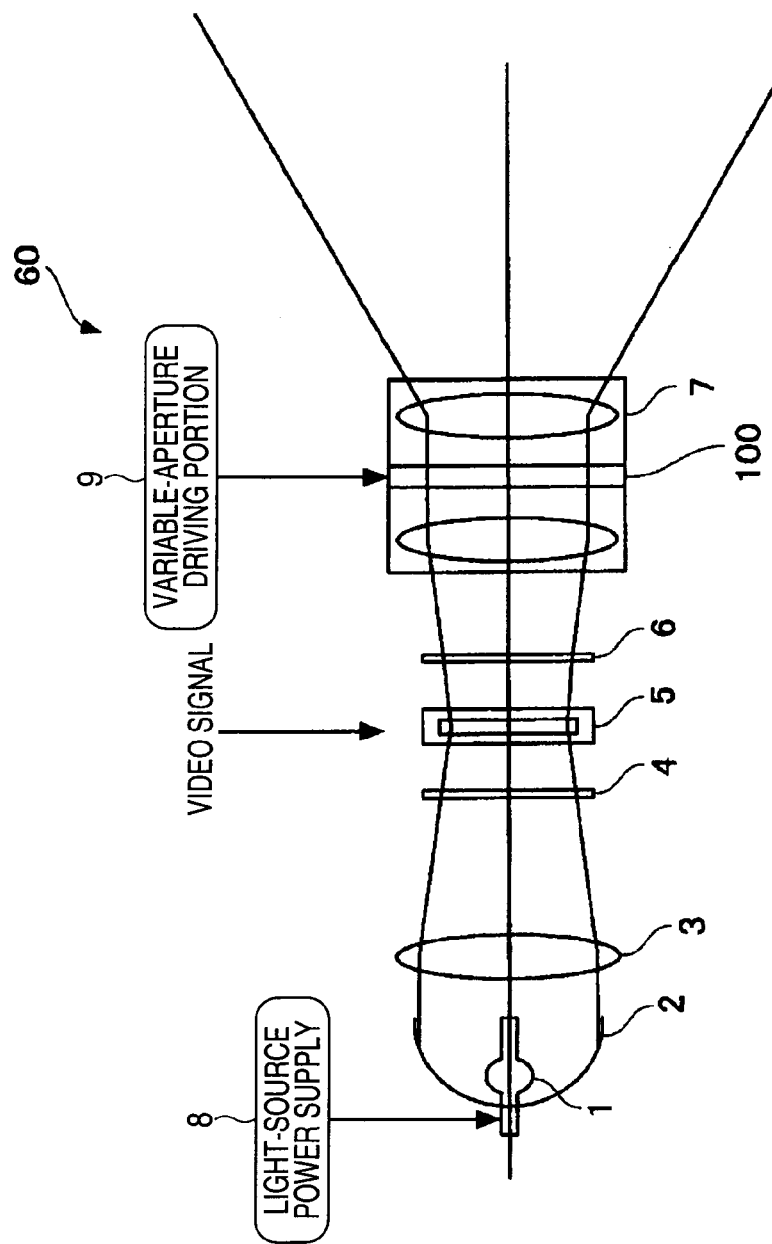
FIG. 6 is a diagram showing another example of the configuration of the liquid crystal projection display apparatus of the embodiment of the invention.

In the above, the liquid crystal projection display apparatus 50 having the configuration in which the variable light transmission device 100 is disposed between the illumination optical system 3 and the polarizer 4 has been described. Alternatively, as shown in FIG. 6, the variable light transmission device 100 may be disposed in the projection lens system 7. Also in the configuration shown in FIG. 6, it is assumed that the longitudinal direction of the diffraction grating of the variable light transmission device 100 is substantially coincident with the transmission polarization direction of the analyzer 6.

The variable light transmission device 100 may be disposed in a number of one or more in the optical path which extends until light emitted from the light source 1 is passed through the projection lens system 7.

In the above, the example in which the variable light transmission device of the invention is used in the liquid crystal projection display apparatus that modulates and projects light of linear polarization has been described. The application of the invention is not restricted to a projection display apparatus which modulates and projects light of linear polarization. When the variable light transmission device 200 shown in FIG. 4 is used, the invention can be applied also to a projection display apparatus which modulates and projects light of random polarization, such as a DMD (digital micro mirror device) projection display apparatus. In this case, the variable light transmission device 200 is placed so as to adjust the block quantity of light entering the image-displaying spatial light modulator or light emitted from the image-displaying spatial light modulator.

EXAMPLES

Hereinafter, a variable light transmission device of an example of the invention will be described. FIG. 1 is a sectional view showing a schematic configuration of the variable light transmission device of the example of the invention. Referring to FIG. 1, a variable light transmission device 100 has: a pair of transparent substrates 101a, 101b which are placed in parallel to each other; a multi-layer grating member 103 which is disposed on a substrate surface of the transparent substrate 101a, and in which transparent members having a multi-layer structure are periodically placed so as to form a diffraction grating; liquid crystal 104 which is interposed between the pair of transparent substrates 101a, 101b on which the multi-layer grating member 103 is disposed, so as to bury the multi-layer grating member 103; transparent electrodes 102a, 102b for applying an electric field to the liquid crystal 104; a seal 105; and wirings 106 for applying an electric signal between the transparent electrodes 102a, 102b.

As the transparent substrates 101a, 101b, a glass substrate having a thickness of 0.6 mm is used. An ITO film having a sheet resistance of about 300Ω/□ is formed on the surfaces of the transparent substrates 101a, 101b by using the sputtering method, and the transparent electrodes 102a, 102b are formed by using the photolithography technique and the etching technique.

Next, by using the sputtering method, an $SiO_2$ film and a $Ta_2O_5$ film are alternately formed in this sequence on the surface of the transparent substrate 101a on which the transparent electrode 102a is formed, so as to form the layer structure shown in Table 1, thereby forming a multi-layer film. After the film-forming of the multi-layer film, the multi-layer film is etched by using the photolithography technique and the etching technique to form the diffraction grating of a periodic pitch of 2 μm. After the diffraction grating is formed, a polyimide film is formed to a thickness of 50 nm on the opposing surfaces of the transparent substrates 101a, 101b by the flexographic printing method, to be formed as orientation films which are not shown. The orientation films are subjected to an orienting process so that liquid crystal molecules are oriented in the longitudinal direction of the diffraction grating.

Next, the seal 105 made of an epoxy resin is printed onto the opposing surface of the transparent substrate 101b, and a liquid crystal cell is produced by thermocompression bonding. In the production, glass fiber which is not shown is mixed into the seal 105 to uniformalize the cell gap. Then, low molecular liquid crystal is poured into the liquid crystal cell by using the vacuum injection method. The liquid crystal has a dielectric anisotropy in which the ordinary refractive index $n_o$ is 1.51 and the extraordinary refractive index $n_e$ is 1.66. A pouring port of the liquid crystal cell is sealed by using a sealing material which is not shown. Then, a flexible circuit board serving as the wirings 106 is disposed so as to be electrically conducted with the transparent electrodes 102a, 102b. An electric signal for controlling the quantity of blocked light is input to the transparent electrodes 102a, 102b through the flexible circuit board serving as the wirings 106.

When light is transmitted through the variable light transmission device 100 which has been produced as described above, the variable light transmission device 100 functions as a diffraction grating because of the refractive index difference between the transparent members of the multi-layer structure and liquid crystal, and diffracts the light. When an electric field is applied to the liquid crystal 104, the tilt angle of liquid crystal molecules is changed in accordance with the degree of the electric field, the effective refractive index to light of a polarization direction which is parallel to the orientation directions of liquid crystal molecules is changed, and the diffraction efficiency can be changed. This causes the zero order transmitted light rate which is linearly transmitted, to be changed, and the variable light transmission device 100 can be realized.

FIG. 7 shows the wavelength dependence of the zero order transmittance in the case where light of a polarization direction which is parallel to the longitudinal direction of the diffraction grating is incident on the variable light transmission device 100 that is produced as described above. The six curves shown in FIG. 7 are views showing the wavelength dependence of the transmittance in the case where the level of the voltage applied between the transparent electrodes 102a, 102b is changed, and the effective refractive index of the liquid crystal is changed. In the curves shown in FIG. 7, a voltage is applied so that the effective refractive index of the liquid crystal is 1.66, 1.64, 1.62, 1.60, 1.57, and 1.52 in ascending order of the zero order transmittance at the wavelength of 650 nm.

In this way, the variable light transmission device 100 in which the zero order transmittance is changed in accordance with the effective refractive index (applied voltage) of the liquid crystal, and the zero order transmittance is substantially constant in the visible light region is obtained. FIG. 10 shows the wavelength dependence of the zero order transmittance obtained in a conventional variable light transmission device, as a comparative example. The variable light transmission device of the comparative example is formed by, for example, using a single SiON film having a refractive index of 1.52.

The curves shown in FIG. 10 are curves showing the wavelength dependence of the zero order transmittance, in the same manner as shown in FIG. 7. In most of the curves shown in FIG. 10, the zero order transmittance further monotonously rises as the wavelength is more increased, and, unlike the curves shown in FIG. 7, is not substantially constant in the visible light region, and has a large wavelength dependence. The wavelength dependence of the zero order transmittance which is shown in FIG. 10 prominently appears in a region where the quantity of blocked light is large, i.e., a region where the zero order transmittance is small. In the case where a diffraction grating configured by a single film is used, therefore, the color temperature is largely changed in a region where the zero order transmittance is low, and this is not preferable as a variable light transmission device for a projection display apparatus.

By contrast, in the variable light transmission device of the invention which uses a multi-layer film, the zero order transmittance can be changed while maintaining the transmittance characteristic that is substantially constant in the visible light region. Therefore, a change of the color temperature can be suppressed in a region where the zero order transmittance is low. Specifically, when a multi-layer film of the layer structure shown in Table 1 is used, the difference between the maximum and minimum values of the transmittance is 20% or less in a wavelength region from 430 nm to 630 nm, even in a curve in which the difference is large. In the case where light is blocked or the zero order transmittance is lowered, the difference between the maximum and minimum values of the transmittance is 15% or less, even in a curve in which the difference is large.

As described above, in the variable light transmission device and the projection display apparatus of the embodiment of the invention, the transparent members possessed by the multi-layer grating member have a multi-layer structure in which plural dielectric thin films having different refractive indexes are periodically stacked. Therefore, the wavelength dependences of the diffraction efficiency can be reduced by providing wavelength dispersion of the refractive index. Vibrations and noises are not generated in adjustment of the quantity of blocked light. The light blocking property is superior to a variable aperture using polymer-dispersed liquid crystal. A color change of a projected image can be reduced as compared with a conventional variable aperture using liquid crystal.

Moreover, the transparent electrodes comprise plural split electrodes, and the transmittance is changeable per each of the areas. Therefore, the quantity of blocked light can be finely adjusted. When the transparent electrode comprises plural split electrodes which are split in annular band shapes centered at the optical axis, the contrast can be effectively improved by cutting a peripheral portion because the contrast of the peripheral portion is originally low.

Furthermore, the layer structure of the multi-layer grating member is configured so that, in the wavelength region from 430 nm to 630 nm, a difference between the maximum and minimum values of the transmittance is 20% or less. Therefore, the layer structure of the multi-layer grating member can be simplified.

Furthermore, the layer structure of the multi-layer grating member is configured so that the difference between the maximum and minimum values of the transmittance when light is blocked is 15% or less. Therefore, the color balance that is more problematic in the case where light is blocked can be improved as compared with a conventional variable light transmission device.

While the invention has been described in detail and with reference to specific embodiments thereof, it will be apparent to those skilled in the art that various changes or modifications may be made therein without departing from the sprit and scope thereof.

The present application is based on Japanese Patent Application No. 2005-026615 filed Feb. 2, 2005, and its disclosure is incorporated herein by reference.

INDUSTRIAL APPLICABILITY

The variable light transmission device and projection display apparatus of the invention can be applied also to the use of a variable light transmission device and projection display apparatus which require effects that vibrations and noises are not generated in adjustment of the quantity of blocked light, that the light blocking property is superior to a variable aperture using polymer-dispersed liquid crystal, and that the use efficiency of light can be improved as compared with a conventional variable aperture using liquid crystal.

The invention claimed is:

1. A variable light transmission device comprising:
a plurality of diffraction gratings each comprising a pair of transparent substrates, a multi-layer grating member, a liquid crystal and a plurality of transparent electrodes,
wherein the pair of transparent substrates are placed in parallel to each other, the multi-layer grating member is disposed on one of opposing substrate surfaces of said pair of transparent substrates, has plural transparent members having a multi-layer structure and periodically placed so as to form a diffraction grating, said diffraction grating has a convex and concave section shape, the liquid crystal is interposed between said pair of transparent substrates to bury said multi-layer grating member, the transparent electrodes are provided for applying an electric field to said liquid crystal, said transparent members possessed by said multi-layer grating member have a multi-layer structure in which plural dielectric thin films having different refractive indexes are periodically stacked, the liquid crystal has an extraordinary refractive index which is larger than an average refractive index of the multi-layer grating member, the plurality of diffraction gratings comprises two diffraction gratings placed such that orientation directions of liquid crystal molecules in the two diffraction gratings are perpendicular to each other, and said multi-layer grating member has reflection regions in a wavelength range from 230 nm to 430 nm and a wavelength range from 630 nm to 1030 nm, wherein the effective refractive index in the long wavelength side of the 230 nm-430 nm reflection band is relatively high, while the effective refractive index in the short wavelength side of the 630 nm-1030 nm reflection band is made relatively small.

2. The variable light transmission device according to claim 1, wherein said transparent electrodes comprise plural split electrodes, said plural split electrodes are split in annular band shapes having a common optical axis at a center, and have a transmittance which is changeable per each of areas where said split electrodes are formed.

3. The variable light transmission device according to claim 1, wherein the layer structure of said multi-layer grating member is configured so that, in a wavelength region from 430 nm to 630 nm, a difference between maximum and minimum values of the transmittance is 20% or less.

4. The variable light transmission device according to claim 1, wherein the layer structure of said multi-layer grating member is configured so that a difference between maximum and minimum values of the transmittance when light is blocked is 15% or less.

5. The variable light transmission device according to claim 1, wherein said transparent members possessed by said multi-layer grating member have a multi-layer structure in which dielectric thin films of $SiO_2$ and $Ta_2O_5$ are alternately stacked.

6. A projection display apparatus comprising:
a predetermined light source;
an image-displaying spatial light modulator which modulates incident light in accordance with a video signal, and which emits the modulated light;

an illumination optical system which comprises plural lenses, and which converges the light emitted by said light source to convergently illuminate said image-displaying spatial light modulator;

a projection lens system which projects light emitted from said image-displaying spatial light modulator; and at least one variable light transmission device according to claim 1, disposed within an optical path which extends until light emitted from said light source is passed through said projection lens system.

7. The projection display apparatus according to claim 6, wherein said transparent electrodes of said variable light transmission device comprise plural split electrodes, and a transmittance is changeable per each of areas where said split electrodes are formed.

8. The projection display apparatus according to claim 7, wherein said transparent electrodes of said variable light transmission device comprise plural split electrodes which are split in annular band shapes while setting an optical axis as a center, and a transmittance is changeable per each of areas where said split electrodes are formed.

9. The projection display apparatus according to claim 6, wherein the layer structure of said multi-layer grating member of said variable light transmission device is configured so that, in a wavelength region from 430 nm to 630 nm, a difference between maximum and minimum values of the transmittance is 20% or less.

10. The projection display apparatus according to claim 6, wherein the layer structure of said multi-layer grating member of said variable light transmission device is configured so that a difference between maximum and minimum values of the transmittance when light is blocked is 15% or less.

11. The projection display apparatus according to claim 6, wherein said transparent members possessed by said multi-layer grating member of said variable light transmission device have a multi-layer structure in which dielectric thin films of $SiO_2$ and $Ta_2O_5$ are alternately stacked.

12. The projection display apparatus according to claim 6, wherein an extraordinary refractive index of the liquid crystal of said variable light transmission device is larger than an average refractive index of said multi-layer grating member.

13. The projection display apparatus according to claim 6, wherein said variable light transmission device comprises two diffraction gratings, and placed so that orientation directions of liquid crystal molecules are perpendicular to each other.

14. The variable light transmission device according to claim 2, further comprising at least three split electrodes.

15. The variable light transmission device according to claim 14, wherein said at least three split electrodes comprise a first, second and third split electrodes configured to progressively reduce a diameter of said aperture upon application of electric fields by said first, second and third split electrodes, respectively.

16. The variable light transmission device according to claim 15, wherein said at least three split electrodes are configured to completely block light transmittance in said aperture.

* * * * *